(12) United States Patent
Larsson

(10) Patent No.: US 6,237,037 B1
(45) Date of Patent: May 22, 2001

(54) METHOD AND ARRANGEMENT RELATING TO COMMUNICATIONS SYSTEMS

(75) Inventor: Martin Larsson, Karlstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/105,667

(22) Filed: Jun. 26, 1998

(30) Foreign Application Priority Data

Jun. 26, 1997 (SE) .................................................. 9702476

(51) Int. Cl.[7] .................................................. G06F 15/16
(52) U.S. Cl. ........................... 709/229; 709/225; 713/201
(58) Field of Search ................................... 709/229, 224, 709/225, 217, 219, 226, 220; 370/356; 380/23, 25; 714/4; 713/202, 201

(56) References Cited

U.S. PATENT DOCUMENTS

| | | | |
|---|---|---|---|
| 5,325,419 | * 6/1994 | Conolly et al. | 379/60 |
| 5,619,657 | 4/1997 | Sudama et al. | 709/225 |
| 5,721,779 | * 2/1998 | Funk | 380/23 |
| 5,835,720 | * 11/1998 | Nelson et al. | 709/224 |
| 5,872,847 | * 2/1999 | Boyle et al. | 380/25 |
| 5,883,891 | * 3/1999 | Williams et al. | 370/356 |
| 6,141,755 | * 10/2000 | Dowd et al. | 713/201 |

FOREIGN PATENT DOCUMENTS

96/08756 3/1996 (WO).
96/42041 12/1996 (WO).

* cited by examiner

Primary Examiner—Mehmet B. Geckil
(74) Attorney, Agent, or Firm—Burns, Doane, Swecker & Mathis, L.L.P.

(57) ABSTRACT

The invention relates to a method and arrangement for detecting and/or tracking a non-authorised client station (11, 20) when accessing a host station (10, 21) in a communications network (12), which also comprises connecting devices (13–17, 22–28) in a route between said client station and host station (10, 21), each client station (11, 20), host station (10, 21) and at least some of said connecting devices (13–17, 22–28) being provided with a unique identity, the method comprising the steps of executing a first verification. The method in case of approved said first verification includes further step of route control comprising: retrieving the unique identity of each of said devices in said route, by propagating an identity inquiry, collecting an identity inquiry response message, including the identity of at least each device having a unique identity, comparing each unique identity of each device and/or station included in said response message with a list of approved identities, and rejecting or accepting the access, based on the comparison result.

17 Claims, 2 Drawing Sheets

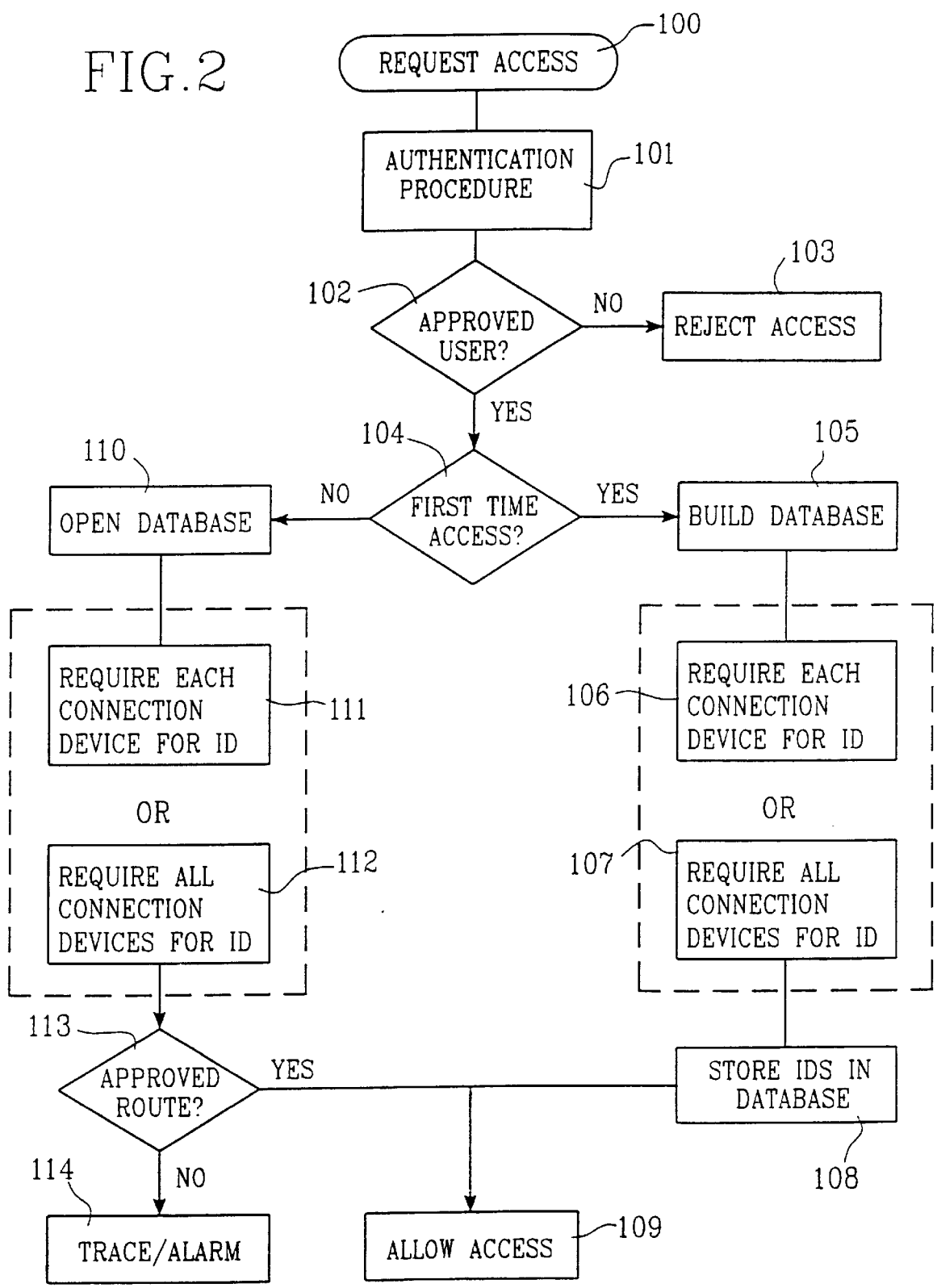

METHOD AND ARRANGEMENT RELATING TO COMMUNICATIONS SYSTEMS

BACKGROUND

The present invention relates to a method and arrangement for detecting and preferably tracking a non-authorised client stations attempt to access a host in a communications network. The communication network comprises connection devices at least each having a unique identity.

The invention also relates to a telecommunications network having a security arrangement.

During recent years, the art of digitalised communications using for example computers, mobile phones etc., has changed dramatically. The changes, besides of being an aid for users and allowing faster and better communication, have given some people opportunity to use the benefits and possibilities of essentially advanced communication means to carry out, more or less, criminal acts, such as fraudulence, e.g. by accessing the company or government computer networks and retrieving, changing or deleting information, or using telephones, switchboards etc. to obtain felonious privileges.

Internet, the global network for computers and computer networks have also contributed to the global communications, by allowing transference of images, voices and other data in a simple and inexpensive way. The result is that companies, government offices, universities and so on, have connected their networks through Internet to supply the internal and external users with relevant information and also to communicate with each other.

As the Internet is a public network, i.e. everybody having a computer and a communication device, such as a modem, may through an Internet Provider Server (IPS) access the Internet and communicate with others or just retrieve information. Internet is, in a superior manner, the fastest and most effective way to distribute a large amount of information for a large number of people.

The "core" of the Internet includes a very large number of computers, standalone or connected in networks, which can exchange information substantially directly using some predetermined protocols, especially Transmission Control Protocol/Internet Protocol (TCP/IP).

Each computer or connecting device in the core is separated from each other by means of an IP address. The IP address consists of a network number. In some cases the IP address is permanently assigned to a device (computer) in other cases the IP address is assigned to a computer temporarily. The IP address provides each connected computer/device a unique identity in the network.

The data transmission may be carried out via, for example fiber-optic lines, satellite links and telephone lines.

At present, obtaining full identification of a client or a user workstation connected or trying to connect to a host system is not possible. Also, It is not possible, in a simple and fast way, to identify the fraud workstation and thereby the user, even though a partial identification is possible.

When accessing a network, usually a login procedure is executed for authentication of the user. The authentication works, by the client first declaring the user name to be used to access the network. The service providing server then responds with a set of authentication methods, which are acceptable. The client then sends an authentication request, and this dialogue continues until an access has been granted or denied. The authentication methods can vary from system to system. Some methods are:

| | |
|---|---|
| none | checks if no authentication is ok, |
| password | a conventional password authentication, which requires a password for access, |
| secureid | secureID authentication is a timing-based hardware token identification, where the user enters a code displayed on the token as authentication. |

Also, on-time passwords and similar methods are available. As other methods public key can be mentioned, in which the possession of a privet key is the authentication.

Great efforts are made to develop methods and algorithms to secure the authentication procedures, but no system is more secure than the user of the system, as passwords and keys may come in possession of non authorised persons. In the Internet case, also the IP addresses can be forged which allows accessing the network without problem.

By forged IP address, it is also possible to attack the Internet service providers, for example by flooding or the like. Flooding is a method where an unreachable source (IP) address is used against a target host computer, which attempts to reserve resources waiting for a response. The attacker repeatedly changes the bogus source address on each new access packet sent, thus exhausting additional host resources. Then, if the attacker uses some valid address as the source address the attacked system responds by sending a large number of reply packages, which at end, results in a degraded performance and even system crash.

U.S. Pat. No. 5,619,657 teaches a method for providing security facility for a network of management servers utilising a database of trust relations to verify mutual relations between management servers. The method relates specially to creating accounts on a system over a network. The management operation (MO) also contains the identity of the user lunching the operation. Through an interface the MO is transferred to a dispatcher of the management server (MS). The MS, in addition to administrating, requests for management services provided by a local system is also responsible for routing MOs on secure paths to other local systems in the network and managing the security of the local system. The MS determines a proper link by means of a database, which maintains trusted relations between the management servers. The trusted relation lists are generated independent from the execution of a communication protocol by an autonomous network utility. Each MS contains a list. The lists are divided into two categories, trusted receivers and trusted senders. Based on the trusted list, forwarding the operations are executed. In summary, the database provides a means for routing MOs from one MS to another MS along a secure path determined by the trust relations of the MSs at each link in the route in the network performing the MO.

SUMMARY

There is a need for a method and arrangement in communications system, specially in a computer network, which provides a simple, effective and straightforward way to increase the security.

There is also a need for a method and arrangement, which allow to detect an unauthorized access attempt to a service providing device or the like in a communications system by a user station or process, by using substantially available procedures.

Through implementation of the method and arrangement, according to the invention there is provided a fast way to trace the position of the fraud user stations.

Therefore the method according to the invention, in case of a first approved control of the identity of a client station trying to access the network, further comprises steps of: retrieving the unique identity of each of said devices in said route, by propagating an identity inquiry, collecting an identity inquiry response message, including the identity of at least each device having a unique identity, sent by each device having an identity and arranged to response, comparing each unique identity of each device and/or station included in said response message with a list of approved identities, and rejecting or accepting the access, based on the comparison result.

In an advantageous embodiment the first verification includes controlling the client station identity and comparing it with a list of approved identities and/or number of accesses made by the client station. If the clients' identity approves and a first time access is detected the method further comprises the steps of: retrieving the unique identity of each of said devices in said route, arranging a database for said client station for storing the connection route by, and including the identity of each device having a unique identity sent by each device having an identity and arranged to response in the database.

It is possible that the identity of each device is collected by propagating an identity requirement and collecting the identity requirement response message. Then a list including said identities received in said response message is arranged, where the identity list constitutes a route list and the list is compared with a list of an approved route list.

In an embodiment, the comparison of the client station identity with a list of known approved clients, is carried out before the route control, which is possible to carry out after the route control.

In the advantageous embodiment, the communications network is a computer network and the unique identity is IP address of the client station, host station and at least some of said connecting devices. Preferably, the communications network is Internet. The communications network may also be Interanet/Extranet.

In another embodiment, an alarm signal is generated in case of rejection or a trace procedure in is executed.

In an embodiment an error message inquiry is sent to each or all devices, asking for identity conflict errors and/or other errors.

According to the invention a security arrangement is provided for detecting and/or tracking a non-authorised user access to a communications network. The network comprises at least one client station at least one host station and connecting devices in a route between said client station and host station, each client station, host station and at least some of said connecting devices being provided with a unique identity. The arrangement comprises means for communication with said host station, client station and connecting devices, memory units for storing information, means for fetching the identity of the client station at login, a comparison device for comparing the identity of the user with a stored identity list, means to propagate a device identity inquiry, means to identify and collect responses to said inquiry including unique identities and means to compare said collected identities with a stored list of identities.

Advantageously, the arrangement is integrated in said host station or separately arranged in a supervising server. The connection devices may be any one of the routers; infrastructure devices such as bridges, terminal servers, gateways, firewalls, repeaters, application servers such as DNS (Domain Name System), mailhubs, news servers, FTP (File Transfer Protocol) servers, WWW (World Wide Webb) servers, network management systems and communication servers.

A telecommunications network according to present invention, including a calling unit, one or more switching stations and links and a receiving station is characterized by a security arrangement for detecting and/or tracking a non-authorised user when connecting speech for said calling unit, each of the calling unit, the switching stations/links being provided with a unique identity. The arrangement further comprising means for collecting identity of each calling unit, switching station, upon a request from said arrangement and creating a list for a call route, comparing said call route with approved call routes and approving or rejecting the call.

BRIEF DESCRIPTION OF THE DRAWINGS

The invention will be further described in the following in a non-limiting way under reference to the enclosed drawings in which:

FIG. 2 is a flowchart, schematically illustrating the function of the embodiment according to FIG. 1.

DETAILED DESCRIPTION

In the following, the invention will be disclosed referring to two non limiting embodiments. The first embodiment is based on a computer network using IP addresses (TCP/IP protocol), examples of such networks are Internet, intranet/Extranet. The second embodiment is a telecommunications network.

It is assumed that the TCP/IP protocol and IP address structure is known for a skilled person, but briefly its operation is based on dividing a message into small packages or datagarms, each of which are transmitted individually and collected to the original message at the destination set. This makes it possible for the packages to take a free route if a route is busy.

Figure 1:
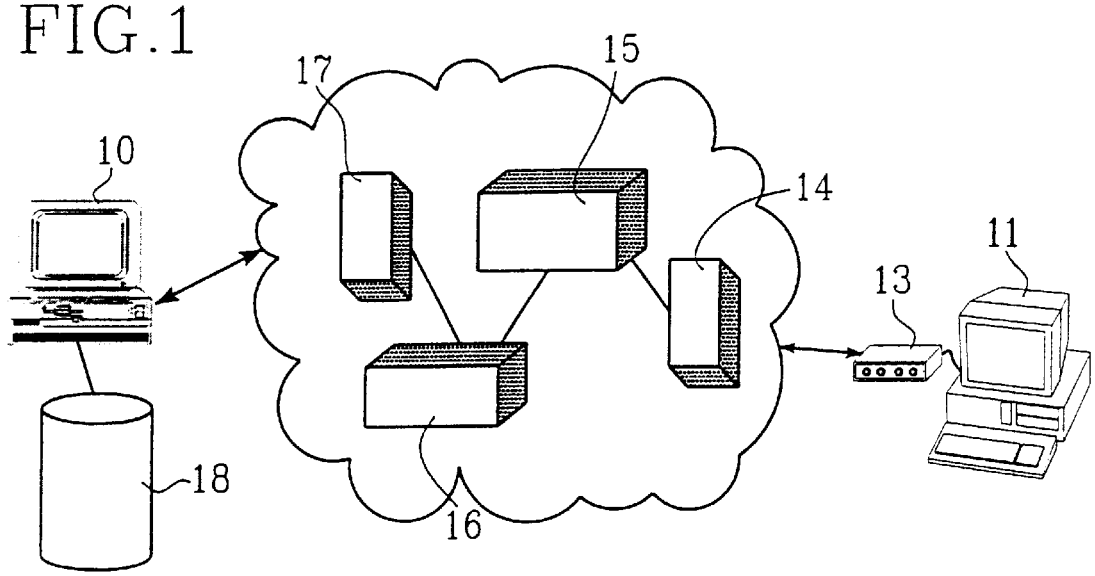
FIG. 1 is a schematic illustration of a first embodiment of a system implementing the invention.

FIG. 1 illustrates a computer network including at least one service providing server (SPS) or supervising server 10. A user or client station (CS) 11 can access the SPS 10 through a network 12 including one or several connection devices 13–17. The SPS 10, CS 11 and substantially each connection device is provided with a unique identity, such as an IP address. Furthermore, the SPS 10 is arranged with a storing means 18. The CS 11 may also be a member of another local network, connected to other computers in the local network by means of network cards in a known manner. In this case the connection device 13 may be a router or the like.

The connection devices and devices having IP address may be any of the:

Routers;

Infrastructure devices such as bridges, terminal servers, gateways, firewalls, repeaters;

Application servers such as DNS (Domain Name System), mailhubs, news servers, FTP (File Transfer Protocol) servers, WWW (World Wide Webb) servers, network management systems etc.;

Peripheral devices, such as printers, printer servers, CD-ROM servers, communication servers etc.

Generally, above-mentioned devices are arranged to return their unique address if a query is directed at them.

The basic idea of the invention will be clear through the following non-limiting operational example with reference to the flowchart of FIG. 2.

The client station 11 directs 100 an access request to one or several servers 10, which also can be a security management server. An authentication procedure 101 is then launched by the server 10 requiring a password or the like. The reply from the client station is then compared with, 102, a list of approved identities stored in the database, for example stored in device 18 of the server 10. If the user name and password are in the list the first step of access is approved, otherwise the access is rejected 103 in a known way. The server 10 may only check the IP address of the CS 11, and use the IP address for further authentication process. If the first step of access is approved, the authentication procedure checks 104, if it is the first time for a client station accessing the server (system). If it is first time access, a new database for the client is built 105. Then the procedure propagates a query on the network, directed to each 106 device 13–17 or all 107 devices 13–17 in the route, through which the communication between the server 10 and the client station 11 is established. The query asks for the identity (IP address) of each connection device 13–17 in the route. If a device is provided with an identity, at receiving the identity query, it transmits back the identity. The identities received by the server are then collected and stored 108 in the database. Then, as this being the first access, the client station is allowed to access 109 the network (services).

At step 104, if it is dedicated that it is not the first access of the client station, a database including data about the client station or dedicated to the client station, including for instance the identities of the connection devices collected by means of a procedure according to previous section, is opened. Then, the procedure propagates a query on the network, directed to each 111 device 13–17 or all 112 devices 13–17 in the route, through which the communication between the server 10 and the client station 11 is established. The query asks for the identity (IP address) of each connection device in the route. If a device is provided with an identity, at receiving the identity query, it transmits back its identity. The identities received by the server are then collected and compared 113 with the list of identities in the database. If the lists of identities confirm, the access is accepted 109. Otherwise, an alarm is generated 114. As the identity of each connection device corresponding to a physical site is retrieved, it is possible to trace 114 the physical location of the client station, even though the user name, password and the IP address are forged.

Moreover, it is possible to control attempts to build a false rout or change the IP addresses without permission. The arrangement can transmit a query, asking the connection devices for any identity conflicts or any error messages related to identity problems. If an identity conflict or error message is detected, then the system may report the detection to a system operator and ask for a manual sanction.

Controlling the first time access is, for example carried out by inspecting a corresponding database for existence of the client station identity (e.g. user name or IP address). In some cases, the identities in the route can vary, for example when a connection device having permanent identity is replaced or the message takes another route. In these cases, it is possible to add the new identity route into the database, preferably after a double check that the client station is operated by an authorized client. It is also possible to arrange the connection devices to report the replacement to a controlling database, whereby the server can check for possible changes. Experiments have shown that the datagrams in a TCP/IP based network, substantially take always the same route.

It is also possible to execute the first authentication procedure 102, asking for user-name and password, after step of route approvals 108 or 113.

The queries for identities of the devices may be executed using existing procedures or special procedures. It is possible to send an "echo request" in form of a data packet to a remote host and wait for each echo reply from each device. Using a trace-route function the server can trace and register the actual route that an IP packet follows to a network, Internet or intranet host. The function "finger" returns the users logged on to remote systems. It is also possible to send a message which returns the entry from a remote registry and information about domains (WHOIS). It is also possible to use net scanning functions, preferably over a specified range of IP addresses, for example by pinging each one, which also returns the names and adding them to the possible host files.

Using the premises of the invention, to avoid a flooding attack, a server may control the route to the origin of the (forged) IP address and take a proper action if needed, and thereby avoid unnecessary ACK/REQ transmissions, which degrades the performance of the system.

It is also possible to arrange the devices not having IP addresses with other unique identities, which can be stored in the route database of the server.

Figure 3:
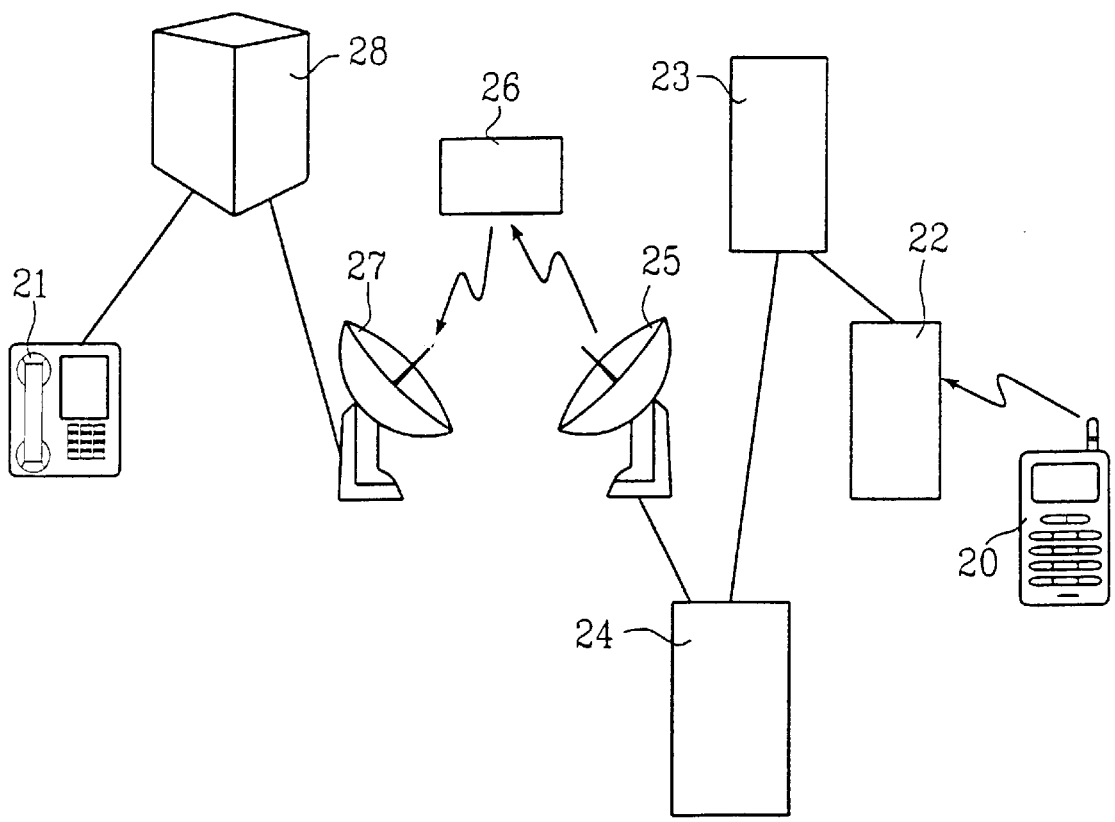
FIG. 3 illustrates another embodiment of the invention.

FIG. 3 shows a telecommunications system employing the method according to the invention. The system includes a calling unit 20, a receiving unit 21 and connecting devices, which can be one or several of base stations 22, switch boards 23, 28, links 24, satellite relays 25, 27 and satellites 26. Preferably, each of the devices 20–28 are provided with a unique identity. When a call is switched, preferably the base station 28 or the receiving unit 21 is arranged with a database including the call route for a call from each authorised calling unit 20. Particularly, in a digitalised network, each device can be arranged to, automatically or on request, add its identity to a message to the base station 28 or the receiving unit 21. Using the received list of the devices in the route, the base station 28 or the receiving unit 21 can decide to allow or not allow the call. This embodiment may be applied to any telecommunications system, components of which have or can be provided with identities, such as GSM, NMT etc.

This system could particularly be useful, for example for security calls, banking transactions etc.

The invention is not limited to the illustrated embodiments but can be varied in a number of ways without departing from the scope of the appended claims and the arrangement and the method can be implemented in various ways depending on application, functional units, needs and requirements etc.

What is claimed is:

1. A method of detecting a non-authorized client station accessing a host station in a communications network, which comprises connecting devices in a route between said client station and the host station, each client station, host station and at least some of said connecting devices being provided with a unique identity, the method comprising the steps of executing a first verification, and after approving said first verification, controlling a route, including the steps of:

retrieving, at the host station, the unique identity of each of said devices in said route, by propagating an identity inquiry, said identity comprising the unique IP address of said device;

collecting an identity inquiry response message, including the identity of at least each device having a unique identity;

comparing each unique identity of each device included in said response message with a list of approved identities stored at a database associated with the host station; and rejecting or accepting the access, based on the comparison result.

2. The method of claim 1, wherein said first verification includes controlling the client station identity and comparing it with a list of approved identities.

3. The method of claim 1, wherein said first verification includes controlling number of accesses made by the client station.

4. The method of claim 3, wherein in case of approval of the client identity and detection of a first time access, the method further comprises the steps of:

retrieving the unique identity of each of said devices in said route arranging a database for said client station for storing the connection route by, and including the identity of each device having a unique identity sent by each device having an identity and arranged to response in the database.

5. The method of claim 4, wherein the identity of each device is collected by propagating an identity requirement and collecting the identity requirement response message.

6. The method of claim 4, further comprising the step of arranging a list including said identities received in said response message, said identity list constituting a route list and comparing said list with a list of approved route list.

7. The method of claim 2, wherein said comparison of the client station identity by a list of known approved clients, is carried out before the route control.

8. The method of claim 2, wherein said comparison of the client station identity by a list of known approved clients, is carried out after the route control.

9. The method of claim 1, wherein said communications network is a computer network.

10. The method of claim 9, wherein said unique identity is an IP address of the client station, host station and at least some of said connecting devices.

11. The method of claim 1, wherein said communications network is Internet.

12. The method of claim 1, wherein that said communications network is an Interanet/Extranet.

13. The method of claim 1, further comprising the step of generating an alarm signal in case of rejection.

14. The method of claim 1, further comprising the step of executing a trace procedure in case of rejection.

15. The method of claim 1, wherein an error message inquiry is send to each or all devices, asking for identity conflict errors and/or other errors.

16. The method of claim 1, further comprising the step of denying access in case of a failure first verification.

17. The method of claim 1, further comprising the step of tracing said non-authorised client station.

* * * * *